United States Patent
Su

(10) Patent No.: US 7,548,554 B2
(45) Date of Patent: Jun. 16, 2009

(54) METHODS FOR CONTROLLING TRANSMISSION OF HIGH-SPEED DATA TRAFFIC IN IPDLS

(75) Inventor: Ning Su, Shenzhen (CN)

(73) Assignee: Huawei Technologies, Co., Ltd., Shenzhen (CH)

(*) Notice: Subject to any disclaimer, the term of this patent is extended or adjusted under 35 U.S.C. 154(b) by 647 days.

(21) Appl. No.: 10/325,708

(22) Filed: Dec. 20, 2002

(65) Prior Publication Data

US 2003/0142636 A1 Jul. 31, 2003

(51) Int. Cl.
*H04L 12/43* (2006.01)

(52) U.S. Cl. ............... 370/459; 370/326; 370/330; 370/436

(58) Field of Classification Search .......... 370/230, 370/235, 315, 320–322, 326, 328–330, 335–337, 370/342, 343, 436, 441–443, 454, 456, 458, 370/459; 455/13.4, 522

See application file for complete search history.

(56) References Cited

U.S. PATENT DOCUMENTS

| 5,689,502 | A | * | 11/1997 | Scott | 370/281 |
| 6,005,856 | A | * | 12/1999 | Jensen et al. | 370/337 |
| 6,374,118 | B1 | * | 4/2002 | Toskala et al. | 455/522 |
| 6,512,750 | B1 | * | 1/2003 | Palenius | 370/318 |
| 6,556,585 | B1 | * | 4/2003 | Moulsley | 370/465 |
| 6,580,753 | B1 | * | 6/2003 | Raaf et al. | 375/240 |
| 6,580,920 | B2 | * | 6/2003 | Kalliojarvi | 455/522 |
| 6,697,347 | B2 | * | 2/2004 | Ostman et al. | 370/335 |
| 2002/0051438 | A1 | * | 5/2002 | Yano et al. | 370/335 |
| 2003/0165125 | A1 | * | 9/2003 | Moulsley | 370/331 |

FOREIGN PATENT DOCUMENTS

| JP | 7503593 | 4/1995 |
| WO | WO 9429981 A1 * | 12/1994 |
| WO | WO-01/24566 | 4/2001 |
| WO | WO-01/52569 | 7/2001 |
| WO | WO 2005120121 A1 * | 12/2005 |

OTHER PUBLICATIONS

Thomas, N.J. et al., "Analysis of IPDL Patterns for Increased Signal Detection Probability in UMTS," IEEE VTS 53rd, Vehicular Technology Conference, May 2001. vol. 4, pp. 2705-2709.*

* cited by examiner

*Primary Examiner*—Donald L Mills
(74) *Attorney, Agent, or Firm*—Edwards Angell Palmer & Dodge LLP; Kathleen Williams; Gabriel J. McCool

(57) ABSTRACT

The transmission of high-speed data traffic in IPDLs at a base station of a cellular communications network is controlled. An IPDL is identified which occurs within a set of time slots of a given channel. The channel may comprise a dedicated time slot channel or a packet-oriented time slot channel. More specifically, the channel may comprise a Dedicated Physical Control Channel or a High Speed Downlink Shared Channel. The information within a time slot of the set is shifted. In accordance with one aspect of the invention, the information is shifted to a reduced portion of the time slot of the channel by reducing a spread spectrum factor for the signal carrying the information and increasing the transmission power of the signal. A remaining portion of the time slot spans at least a duration of the identified IPDL. In accordance with another aspect of the invention, the information within the time slot is shifted to another time slot of the channel.

8 Claims, 6 Drawing Sheets

METHODS FOR CONTROLLING TRANSMISSION OF HIGH-SPEED DATA TRAFFIC IN IPDLS

RELATED APPLICATIONS DATA

The present application claims priority to Chinese Application No. 01 144553.X filed Dec. 20, 2001, the content of which is hereby expressly incorporated by reference in its entirety.

BACKGROUND OF THE INVENTION

1. Field of the Invention

The present invention relates to a method for high-speed data transmission in wireless communication systems, particularly to a method for controlling transmission of high-speed data traffic in IPDLs.

2. Background of the Invention

Wideband Code Multiple Address (WCDMA) systems use a plurality of approaches to locate mobile stations. In one of those approaches, a mobile station measures time differences when a signal arrives from different base stations. The base station in the cell where the mobile station is located should be closed temporarily to decrease interference. This helps facilitate a mobile station to measure the time when the signal arrives from other base stations, avoid any interference of nearby service base stations to the mobile station, and enhance the receiving sensitivity of the signal from remote base stations. The time of closing downlink transmittion, i.e., IPDL, is usually half of a time slot, and an IPDL occurs usually every 100 ms. The mobile station measures the time when the signal arrives from other base stations through IPDL so that the mobile station can locate itself.

Idles in downlinks are implemented at the cost of system performance. During IPDLs, the base station closes the signal transmitting downlink; thus, all mobile stations in the coverage area of the base station cannot receive the signal in half of a time slot every 100 ms, which means all the mobile stations lose information in half of a time slot. For fault tolerant and low speed traffic (e.g., voice), such deep-attenuation-like transitory losses can be compensated with TTI error correction codes due to the long transmission time interval (TTI). However, for high-speed data traffic (e.g., 10 Mbps), the data loss in half time slot will reach 3333 bits. Furthermore, such data loss can't be compensated merely with error correction codes because TTIs for high-speed data traffic may be as short as a time slot. At the same time, packet switched data requires zero error data transmission, and data unable to be corrected will be retransmitted. Therefore IPDL will decrease the utilization coefficient of channels.

SUMMARY OF THE INVENTION

Objects of the present invention include providing a method for controlling transmission of high-speed data traffic in IPDLs to decrease the effect of IPDL on data traffic and system capacity, to reduce delays in receiving data, and to improve the utilization coefficient of channels.

DETAILED DESCRIPTION OF THE EMBODIMENT

The present invention is described in further detail according to the drawings and the embodiment.

A high-speed data traffic downlink carries data information and corresponding control information. Usually the control information is transmitted through Dedicated Physical Control Channel (DPCH), while the data information is transmitted through High Speed Downlink Shared Channel (HS-DSCH). The DPCH is allocated for each user, and the HS-DSCH is shared by all users, and data of different users is identified through time division and code division in the HS-DSCH. The users' control information in HS-DSCH is transmitted to the mobile station several TTIs ahead through the users' DPCH so as to know the modulation and encoding formats related to the data in the HS-DSCH in advance. Accordingly, when the data arrives, correct demodulation and decoding can be performed. Therefore, an IPDL can result in not only loss of data in the current HS-DSCH but also loss of control information in the current DPCH. As a result, it will affect correct demodulation and decoding for subsequent data.

On the basis of the analysis, if the IPDL occurs in the DPCH, the spread spectrum factor of 2 time slots adjacent to the IPDL shall be halved; if an IPDL occurs in the HS-DSCH, the signal transmitted during the time slot can be adjusted or closed on the whole according to the position of the IPDL, and the influence of IPDL can be reduced.

Figure 2:
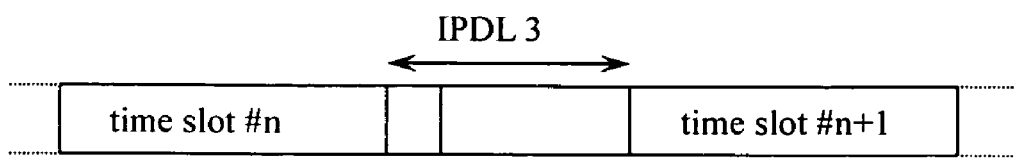
FIG. 2 shows the position where an IPDL occur

Because an IPDL occupies half a time slot and may occur at any position, it may occupy only one time slot or span two time slots. As shown in FIG. 2, in the present embodiment, the transmission of high-speed data traffic is controlled in two ways.

Figure 1:
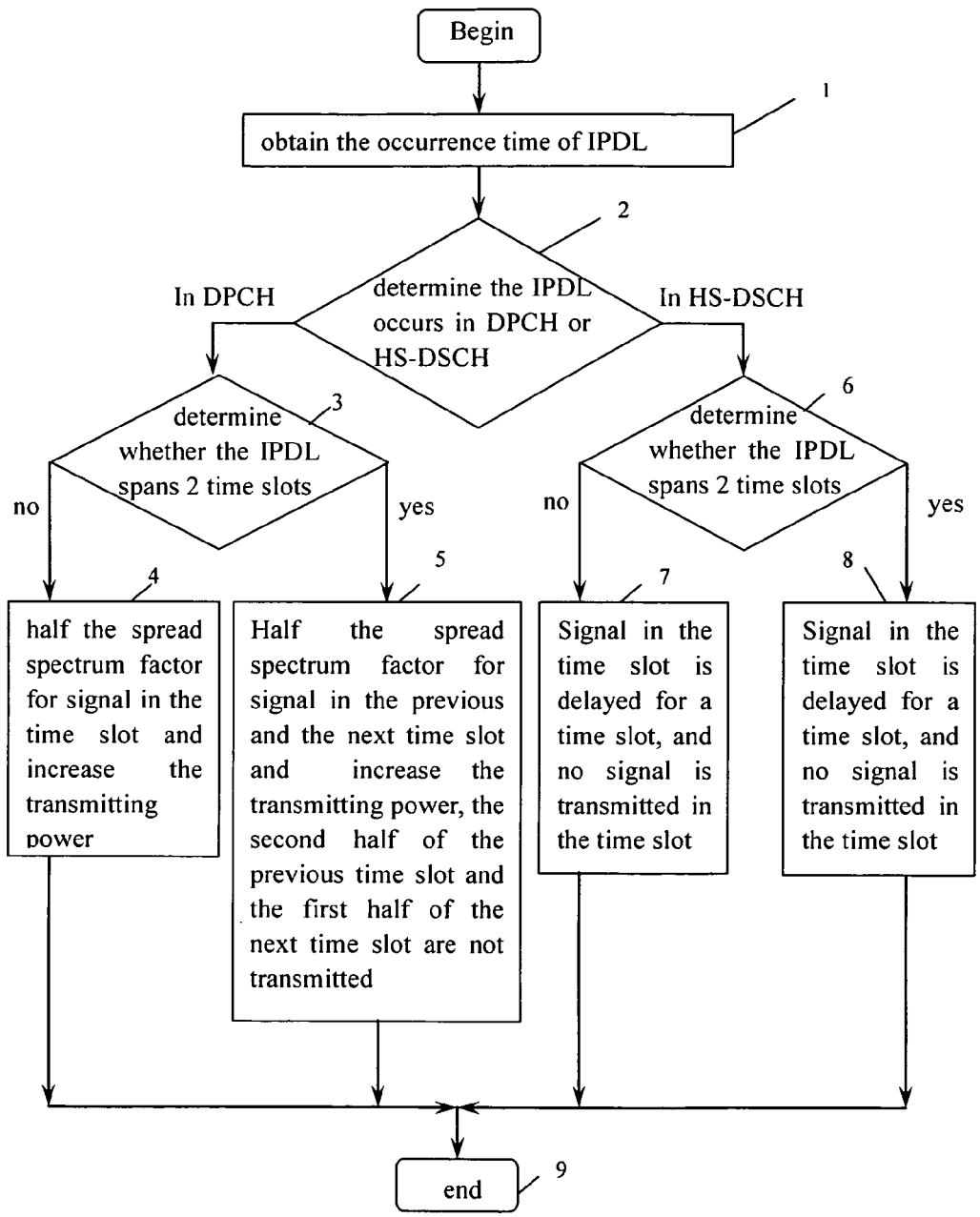
FIG. 1 is the flow chart of an embodiment of a method according to the present invention.
Figure 3:
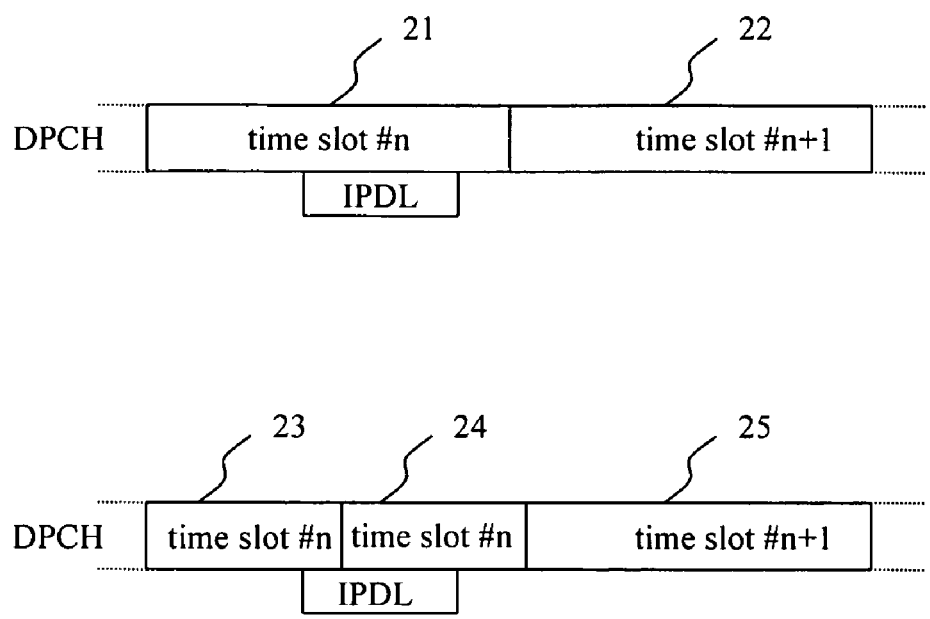
FIG. 3 shows the position where an IPDL occupies a time slot of DPCH.

FIG. 1 is the flow chart of an embodiment of a high speed data transmission method according to the present invention. According to FIG. 1, first, the occurrence time of an IPDL is obtained in step (1). Then, in step (2) a determination is made as to whether the occurrence time is in the DPCH or in the HS-DSCH. When it occurs in the DPCH, the process turns to step (3). For the DPCH, as shown in FIG. 3, because the spread spectrum factor is usually 256 or 512, in the case of enough code resource, the spread spectrum factor may be halved to enable the data in each original time slot to repeat in the first half and in the second half. In FIG. 3, components 21 and 22 are two integral time slots; when an IPDL occurs, the spread spectrum factor for time slot #n is halved. Thus time slot #n is split into two partial components 23 and 24 with the same content, each of which occupies half a time slot. In this way, the whole component (slot 21) can be recovered only through merging components 23 and 24 at the receiving end. When the halved spread spectrum factor is transmitted, in order to ensure receiving quality, compared to components 21 and 22, transmission of components 23 and 24 should be provided with added transmission power compensation.

Figure 4:
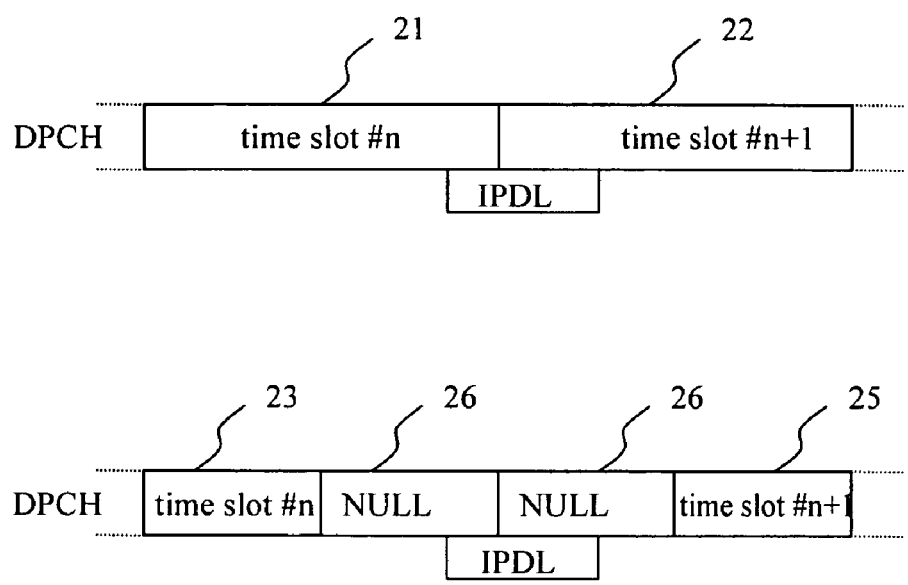
FIG. 4 shows the position where an IPDL spans 2 time slots of DPCH.

For a DPCH where an IPDL spans two time slots, as shown in FIG. 4, both of the time slots shall be processed with a halved spread spectrum. The component 21 (i.e., time slot #n) is changed to component 23 after it is processed with a halved spread spectrum, and it is in the first half time slot. The component 22 (i.e., time slot #n+1) is changed to component 25 after it is processed with a halved spread spectrum, and it is in the second half time slot. The second half time slot of component 23 and the first half time slot of component 25 is the position where the IPDL is, and they are marked as component 26. When the component 26 is set to NULL, the signal stops transmitting. Thus, no signal will be transmitted for one time slot in DPCH, so interference to other users is reduced within this time, and the requirement for closing the signal during the IPDL is satisfied. At the same time, information loss can be eliminated by using a halved spread spectrum factor. Similarly, the transmission power for the halved spread spectrum factor also needs to be increased.

Therefore in step (3), a determination is continuously made as to whether the IPDL spans two time slots of DPCH. If not, the process turns to step (4). In step (4), the signal in the time slot occupied by the IPDL is processed with a halved spread spectrum factor, and the transmitting power is increased. Then the process in the current IPDL ends. If the IPDL is determined to span 2 channels, the process turns to step (5), and the earlier time slot spanned by the IPDL is processed with a halved spread spectrum factor. The processed time slot is placed in a first half of the earlier time slot. The next latter time slot spanned by the IPDL is processed with a halved spread spectrum factor, and the processed time slot is placed in the second half of the latter time slot. The transmitting power of signal in the first half of the earlier time slot and of the second half of the latter time slot is increased. The transmission of the signal in the second half of the earlier time slot and in the first half of the latter time slot is stopped. Then the process STET the current IPDL ends.

In steps (4) and (5), the transmitting power is doubled.

In step (2), if the IPDL is determined to occur in an HS-DSCH, the process turns to step (6) to process the IPDL according to the characteristics of the HS-DSCH.

For HS-DSCH, the spread spectrum factor is small (usually 16) due to heavy high-speed data traffic. If many code fragments are occupied, it is impossible to halve the spread spectrum factor and increase data transmitting power. Because the resource in HS-DSCH are allocated to different users through Time Division Multiplexing, data packets can be delayed for the time slot where the IPDL is using the channel resource.

Figure 5:
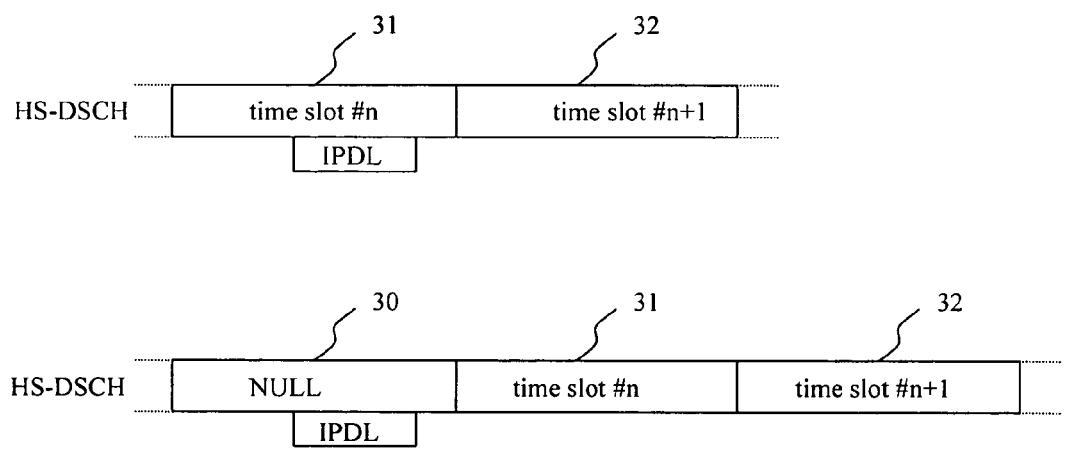
FIG. 5 shows the position where an IPDL occupies a time slot of HS-DSCH.
Figure 6:
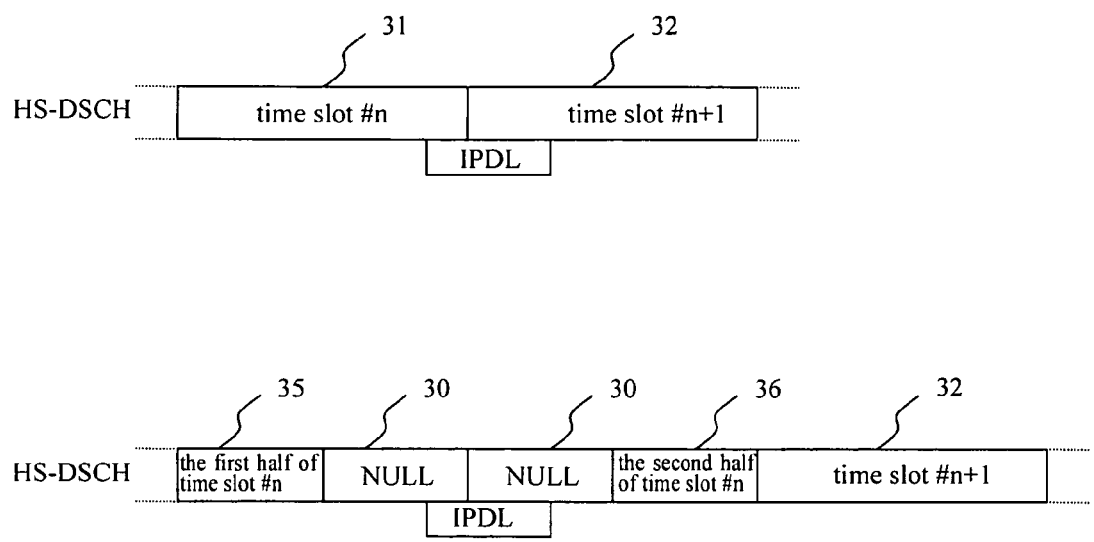
FIG. 6 shows the position where an IPDL spans 2 time slots of HS-DSCH.

For the case that an IPDL occupies one time slot, referring to FIG. 5, an integral empty time slot is inserted in the position where the IPDL is when the base station sends the HS-DSCH. In the time slot, no signal is transmitted from the HS-DSCH, which can reduce the interference to other users. When an IPDL spans two time slots, referring to FIG. 6, the time slot #n is split into two parts. The first half is transmitted in the first half of an original time slot #n, and the second half is transmitted in the second part of an original time slot #n+1. The time slot #n+1 is delayed for one time slot before being transmitted. The second half of original time slot #n and the first half of original time slot #n+1 are set to NULL, which can reduce interference to other users in a time slot.

Therefore, in step (6), a determination is made as to whether the IPDL spans two time slots of the HS-DSCH. If not, the process turns to step (7), and an integral empty time slot is inserted in the position where the IPDL is. In the time slot, no signal will be transmitted. Then the process for the current IPDL ends. If the IPDL is determined to span two time slots of the HS-DSCH, the process turns to step (8), and the two time slots (previous and next) spanned by the IPDL are split into two respective parts. The signal in the first half of the previous time slot is transmitted normally. The signal in the second half of the previous time slot is shifted to the second half of the next time slot to transmit. And the signal in the next time slot is delayed for one time slot before being transmitted. The second half of the previous time slot and the first half of the next time slot stop transmitting, and finally the process for current IPDL ends.

The invention claimed is:

1. A method for controlling transmission of high-speed data traffic in IPDLs in a wireless communication network, said method comprising:
    identifying an occurrence of an IPDL, and determining whether the IPDL is in a Dedicated Physical Control Channel (DPCH), by the network;
    when the IPDL is in a DPCH, determining whether the IPDL spans two time slots in the DPCH;
    when the IPDL spans one time slot of the DPCH, halving a spread spectrum factor for a signal in the time slot occupied by the IPDL and increasing a transmitting power for the signal;
    when the IPDL spans two time slots of the DPCH, halving the spread spectrum factor of the previous time slot spanned by the IPDL, shifting information of the previous time slot into a first half time slot of the previous time slot, halving the spread spectrum factor of the next time slot spanned by the IPDL, and shifting information of the next time slot into a second half of the next time slot, and increasing the transmitting power for the signal in the shifted time slot portions of the previous time slot and the next time slot;
    determining whether the IPDL spans two time slots of an HS-DSCH;
    when the IPDL spans one time slot of the HS-DSCH, shifting the time slot to a latter time slot in the HS-DSCH;
    when the IPDL spans two time slots of the HS-DSCH, shifting a portion of the previous time slot to a latter time slot and shifting a portion of the next time slot to a latter time slot, remaining non-shifted portions of the time slots spanning at least a duration of the identified IPDL.

2. The method for controlling transmission of high-speed data traffic in IPDLs of claim 1, wherein when transmitting power is increased it is doubled.

3. The method for controlling transmission of high-speed data traffic in IPDLs of claim 1, wherein transmission of a signal in the portions of the time slot away from which information is shifted is stopped.

4. A method for controlling transmission of high-speed data traffic in IPDLs in a wireless communication network, said method comprising:
    identifying an occurrence of an IPDL, and determining whether the IPDL is in a Dedicated Physical Control Channel (DPCH) by the network;
    when the IPDL is in a DPCH, determining whether the IPDL spans one time slot or two time slots in the DPCH;
    when the IPDL spans one time slot of the DPCH, halving the spread spectrum factor for a signal in the time slot occupied by the IPDL and increasing a transmitting power for the signal;
    when the IPDL spans two time slots of the DPCH, halving the spread spectrum factor of the previous time slot spanned by the IPDL, shifting information of the previous time slot into a first half time slot of the previously time slot, halving the spread spectrum factor of the next time slot spanned by the IPDL, and shifting information of the next time slot into a second half of the next time slot, and increasing the transmitting power for the signal in the shifted time slot portions of the previous time slot and the next time slot.

5. The method for controlling transmission of high-speed data traffic in IPDLs of chain 4, wherein when the transmitting power is increased, it is doubled.

6. The method for controlling transmission of high-speed data traffic in IPDLs of claim 4, wherein transmission of a signal in the portions of the time slot away from which information is shifted is stopped.

7. A method for controlling transmission of high-speed data traffic in IPDLs in a wireless communication network, said method comprising:
   identifying an occurrence of an IPDL, and determining whether the IPDL spans two time slots of the High Speed Downlink Shared Channel (HS-DSCH) by the network;
   when the IPDL spans one time slot of the HS-DSCH, shifting the time slot to a latter time slot in the HS-DSCH;
   when the IPDL spans two time slots of the HS-DSCH, shifting a portion of the previous time slot to a latter time slot and shifting a portion of the next time slot to a latter time slot, remaining non-shifted portions of the time slots spanning at least a duration of the identified IPDL.

8. The method for controlling transmission of high-speed data traffic in IPDLs of claim 7, wherein transmission of a signal in the portions of the time slot away from which information is shifted is stopped.

* * * * *